(12) United States Patent
Sugie et al.

(10) Patent No.: US 8,197,967 B2
(45) Date of Patent: Jun. 12, 2012

(54) LONG LIFE AND LOW CORROSION LEAD STORAGE BATTERY WITH A SEPARATOR INCLUDING SILICA AND OIL

(75) Inventors: Kazuhiro Sugie, Shizuoka (JP); Kazuhiko Shimoda, Shizuoka (JP); Shozo Murochi, Aichi (JP); Tsunenori Yoshimura, Shizuoka (JP); Shinichi Iwasaki, Shizuoka (JP); Shoji Horie, Shizuoka (JP); Koichi Yonemura, Kyoto (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 10/585,078

(22) PCT Filed: Apr. 1, 2005

(86) PCT No.: PCT/JP2005/006475
§ 371 (c)(1),
(2), (4) Date: Jun. 29, 2006

(87) PCT Pub. No.: WO2005/096431
PCT Pub. Date: Oct. 13, 2005

(65) Prior Publication Data
US 2008/0241686 A1    Oct. 2, 2008

(30) Foreign Application Priority Data

| Apr. 2, 2004 | (JP) | 2004-109809 |
| Apr. 6, 2004 | (JP) | 2004-111810 |
| Aug. 27, 2004 | (JP) | 2004-248061 |
| Oct. 18, 2004 | (JP) | 2004-302594 |
| Oct. 18, 2004 | (JP) | 2004-302595 |
| Nov. 12, 2004 | (JP) | 2004-328748 |
| Nov. 12, 2004 | (JP) | 2004-328749 |
| Nov. 25, 2004 | (JP) | 2004-340225 |

(51) Int. Cl.
*H01M 4/13* (2010.01)
*H01M 4/02* (2006.01)

(52) U.S. Cl. ............... 429/225; 429/211

(58) Field of Classification Search .............. None
See application file for complete search history.

(56) References Cited

U.S. PATENT DOCUMENTS
3,227,583 A * 1/1966 Carlisle .................. 429/60
(Continued)

FOREIGN PATENT DOCUMENTS
JP    62-022225    1/1987
(Continued)

OTHER PUBLICATIONS
JP 2003-346888 machine translation, Yonemura Koichi, Dec. 5, 2003.*
(Continued)

*Primary Examiner* — Barbara Gilliam
*Assistant Examiner* — Kwang Han
(74) *Attorney, Agent, or Firm* — McDermott Will & Emery LLP (57) ABSTRACT

A lead storage battery of the present invention has an electrode plate pack comprising a plurality of negative electrode plates in each of which a negative electrode active material layer is retained by a negative electrode grid, a plurality of positive electrode plates in each of which a positive electrode active material layer is retained by a positive electrode grid, and a plurality of separators separating the positive electrode plate and the negative electrode plate; a positive electrode connecting member connected to each positive electrode plate of the electrode plate pack, and a negative electrode connecting member connected to each negative electrode plate of the electrode plate pack. The positive and negative electrode grids, and the positive and negative electrode connecting members comprise a Pb alloy including at least one of Ca and Sn; the negative electrode active material layer includes Sb; and the separator includes silica.

15 Claims, 4 Drawing Sheets

U.S. PATENT DOCUMENTS

| | | | | |
|---|---|---|---|---|
| 4,210,709 A | * | 7/1980 | Doi et al. | 429/250 |
| 5,989,750 A | * | 11/1999 | Ohba et al. | 429/251 |
| 2007/0160903 A1 | * | 7/2007 | Sugie et al. | 429/161 |

FOREIGN PATENT DOCUMENTS

| JP | 62-22225 | 5/1987 |
|---|---|---|
| JP | 03-015162 | 1/1991 |
| JP | 03-037962 | 2/1991 |
| JP | 11-026012 | 1/1999 |
| JP | 2003-109567 | 4/2003 |
| JP | 2003-346888 | 5/2003 |
| JP | 2003-346790 | 12/2003 |

OTHER PUBLICATIONS

JP 08-236101 machine translation, Haruno et al., Sep. 13, 1996.*

Chinese Office Action with English Translation issued in Chinese Patent Application No. CN 2005-800045463 dated on Mar. 21, 2008.

* cited by examiner

LONG LIFE AND LOW CORROSION LEAD STORAGE BATTERY WITH A SEPARATOR INCLUDING SILICA AND OIL

RELATED APPLICATION

This application is a national phase of PCT/JP2005/006475 filed on Apr. 1, 2005, which claims priority from Japanese Application Nos. 2004-109809 filed Apr. 2, 2004, 2004-111810 filed Apr. 6, 2004, 2004-248061 filed Aug. 27, 2004, 2004-302594 filed Oct. 18, 2004, 2004-302595 filed Oct. 18, 2004, 2004-328748 filed Nov. 12, 2004, 2004-328749 filed Nov. 12, 2004, and 2004-340225 filed Nov. 25, 2004, the disclosures of which Applications are incorporated by reference herein. The benefit of the filing and priority dates of the International and Japanese Applications is respectfully requested.

TECHNICAL FIELD

The present invention relates to lead storage batteries. More particularly, the present invention relates to an improvement in service life properties of lead storage batteries used for vehicles carrying a stop-and-go-system and a regenerative-braking-system.

BACKGROUND ART

Conventionally, lead storage batteries have been used for starting an engine and for a back-up power source of a vehicle. Among these usages, lead storage batteries for starting an engine function to supply electricity to various electric and electronic devices mounted on vehicles, in addition to a cell motor for starting the engine. After starting the engine, the lead storage battery is charged by an alternator. An output voltage and an output current of the alternator are set so that SOC (state of charge) of the lead storage battery is maintained to be 90 to 100%.

In recent years, a demand for an improvement in fuel-efficiency of the vehicle is increasing, in view of environmental conservation. For such demand, vehicles carrying the stop-and-go-system and the regenerative-braking-system have been considered, for example. In the stop-and-go-system, the engine is stopped while the vehicle is idling, and in the regenerative-braking-system, kinetic energy of the vehicle at the time of deceleration is converted to electrical energy, and the electrical energy is stored.

In a vehicle carrying the stop-and-go-system, the lead storage battery is not charged when the vehicle is stopped in an idle stop mode. The lead storage battery sometimes supplies electrical power to devices mounted on the vehicle while in such a state. Thus, in comparison with conventional lead storage batteries for starting engines, SOC of the lead storage battery inevitably becomes low. In a vehicle carrying the regenerative-braking-system, SOC of the lead storage battery has to be controlled to be lower, to about 50 to 90%, since electrical energy is stored by the lead storage battery at the time of regeneration (deceleration).

In any of these systems, charge and discharge (charge/discharge) are repeated frequently with a lower SOC range than ever. Further, an increase in dark current accompanied with vehicle parts increasingly becoming electrically powered, a discharge of the lead storage battery advances while the vehicle is stopped for a long period of time, thereby leaving a possibility for an over discharge.

Therefore, for the lead storage battery to be used in vehicles carrying these systems, service life properties under a usage mode in which charge/discharge is repeated frequently with a lower SOC range need to be improved.

For deterioration factors of a lead storage battery under such usage mode, an insufficient charge due to a lowering of chargeability of the lead storage battery can be mentioned, mainly. Since a charge system of a vehicle is based on constant voltage control, when chargeability of the negative electrode plate is reduced, a potential of negative electrode decreases at an initial stage of charge and a voltage rapidly rises up to a preset voltage value, thereby decreasing the current sooner. Thus, a sufficient amount of charged electricity of the lead storage battery cannot be secured, thereby rendering the battery to be in an undercharged state.

For suppressing such deterioration, there has been proposed a method in which a lead alloy layer containing Sn and Sb is formed on a surface of a positive electrode grid of a Pb—Ca—Sn alloy, for example (Patent Document 1). The formation of such layer will suppress deterioration of the positive electrode active material and formation of a passivated layer at an interface between the positive electrode active material and the positive electrode grid.

Also, the Sb which exists on a surface of the positive electrode grid partly dissolves in the electrolyte, and deposits on the negative electrode plate. The deposited Sb on the negative electrode active material will raise a charging potential of the negative electrode plate, and a charging voltage will lower down, thereby improving chargeability of the lead storage battery. As a result, deterioration of the lead storage battery due to insufficient charge during charge/discharge cycles will be suppressed.

This method is very effective in the engine starting lead storage battery which is used while SOC is over 90%, and service life properties will drastically improve.

However, when a lead storage battery is to be used in a vehicle equipped with the above stop-and-go-system or the regenerative-braking-system, that is, when a lead storage battery is to be used in a mode in which charge/discharge is repeated under a lower SOC range, there was a problem in that corrosion easily advances in the tab of negative electrode grid, although the chargeability can be secured. When the corrosion advances in the negative-electrode-grid-tab, current collecting efficiency of the negative electrode plate declines due to a decrease in a thickness of the tab, thereby shortening its service life.

The decrease in a thickness of the negative-electrode-grid-tab also weakens strength of the tab, in addition to the decline in the current collecting efficiency. Especially, in batteries mounted on vehicles, since vibrations and impacts are constantly applied to the vehicle while traveling, deformations of the negative-electrode-grid-tab cause the negative electrode plate to become out of position, leaving a possibility for an occurrence of an internal short-circuit by creating contacts between the negative electrode plate and the positive electrode plate.

Conventionally, regarding the corrosion of the negative-electrode-grid-tab, it has been known that by an exposure of a negative electrode strap and the negative-electrode-grid-tab from an electrolyte to oxygen in air, a welded part of the strap and the tab is corroded to cause a disconnection. However, although the negative electrode strap and the negative-electrode-grid-tab are being immersed in the electrolyte, the negative-electrode-grid-tab is easily being corroded when Sb is deposited in a very small amount on a surface of the negative-electrode-grid-tab by dissolution of Sb included in the positive electrode grid and of Sb included in a positive electrode connecting member comprising a positive electrode strap, a positive electrode pole, and a positive electrode connecting body into the electrolyte.

In Patent Document 2, there has been proposed a lead storage battery in which the positive electrode grid, the positive electrode connecting member, the negative-electrode-grid-tab, and the negative electrode connecting member are formed from Pb or a Pb-alloy not including Sb, and a very small amount of Sb is included in one of the negative electrode grid or the negative electrode active material layer to a degree that would not increase an amount of electrolyte loss. Based on such structure, it has been shown that chargeability and a service life for a deep discharge of a battery are improved to a certain extent, by suppressing a dissolution of Sb existing in the positive electrode plate into the electrolyte, and deposition of Sb on the negative-electrode-grid-tab.

However, Patent Document 2 above as well had a problem in that under a usage mode where a charge/discharge is repeated frequently while SOC is in a low range, the negative-electrode-grid-tab is corroded by a dissolution of Sb in the negative electrode active material layer into the electrolyte, and a deposition of the Sb on the negative-electrode-grid-tab.

Patent Document 1: Japanese Laid-Open Patent Publication No. Hei 03-37962

Patent Document 2: Japanese Laid-Open Patent Publication No. 2003-346888

DISCLOSURE OF INVENTION

Problem that the Invention is to Solve

Thus, an object of the present invention is to provide a lead storage battery with a longer service life and high reliability under a usage mode where a charge/discharge is repeated frequently while SOC is in a low range, by improving chargeability and suppressing corrosion of the negative electrode grid.

Means for Solving the Problem

The present invention is a lead storage battery including:
an electrode plate pack comprising a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive electrode plate and the negative electrode plate;
a positive electrode connecting member comprising a positive electrode strap to which the tab of each positive electrode plate of the electrode plate pack is connected, and a positive electrode pole or a positive electrode connecting body provided at the positive electrode strap; and
a negative electrode connecting member comprising a negative electrode strap to which the tab of each negative electrode plate of the electrode plate pack is connected, and a negative electrode pole or a negative electrode connecting body provided at the negative electrode strap,
wherein the positive electrode grid, the negative electrode grid, the positive electrode connecting member, and the negative electrode connecting member comprise a Pb-alloy including at least one of Ca and Sn,
the negative electrode active material layer includes Sb, and
the separator includes silica.

In a first preferred embodiment of the separator, the separator comprises a microporous synthetic resin sheet and silica particles dispersed in the synthetic resin sheet, and includes 40 to 85% by mass of the silica particles.

In a second preferred embodiment of the separator, the separator comprises a fiber mat and silica particles retained by the fiber mat, and includes 10 to 40% by mass of the silica particles.

It is preferable that the negative electrode active material layer includes 0.0002 to 0.006 parts by mass of the Sb per 100 parts by mass of the negative electrode active material and Sb in total.

It is preferable that the positive electrode grid has a lead alloy layer containing Sn in at least a part of the surface of the positive electrode grid frame.

It is preferable that the separator is shaped like a bag, and accommodates the negative electrode plate.

It is preferable that the separator contains 5 to 30% by mass of an oil.

It is preferable that the mass ratio of the negative electrode active material to the positive electrode active material in the electrode plate pack is 0.7 to 1.3.

It is preferable that the negative electrode grid is an expanded grid comprising an expanded mesh retaining the negative electrode active material layer, a frame provided at an upper edge portion of the expanded mesh, and the tab connected to the frame, and a ratio of a height of the tab to a width of the frame is 2.2 to 15.0.

Effects of the Invention

According to the present invention, a lead storage battery with a longer service life and high reliability can be obtained under a usage mode in which charge/discharge is frequently repeated under a comparatively low SOC range, since chargeability is improved and corrosion of the negative-electrode-grid-tab is suppressed. Also, although there is a possibility for the battery to be in an over-discharge state under such usage mode, corrosion of the negative-electrode-grid-tab can be suppressed even under the over-discharge state.

BEST MODE FOR CARRYING OUT THE INVENTION

The present invention relates to a lead storage battery for vehicles carrying the stop-and-go-system and the regenerative-braking-system. In the present invention, a Pb-alloy substantially not including Sb, which advances corrosion of the negative-electrode-grid-tab, is used for the positive electrode grid, the positive electrode connecting member, the negative electrode grid, and the negative electrode connecting member. Sb is added to the negative electrode active material, and silica is to be contained in the separator. Based on such battery, service life of the battery can be extended significantly for the usage mode of the above systems which repeat charge/discharge frequently under a low SOC range.

Figure 1:
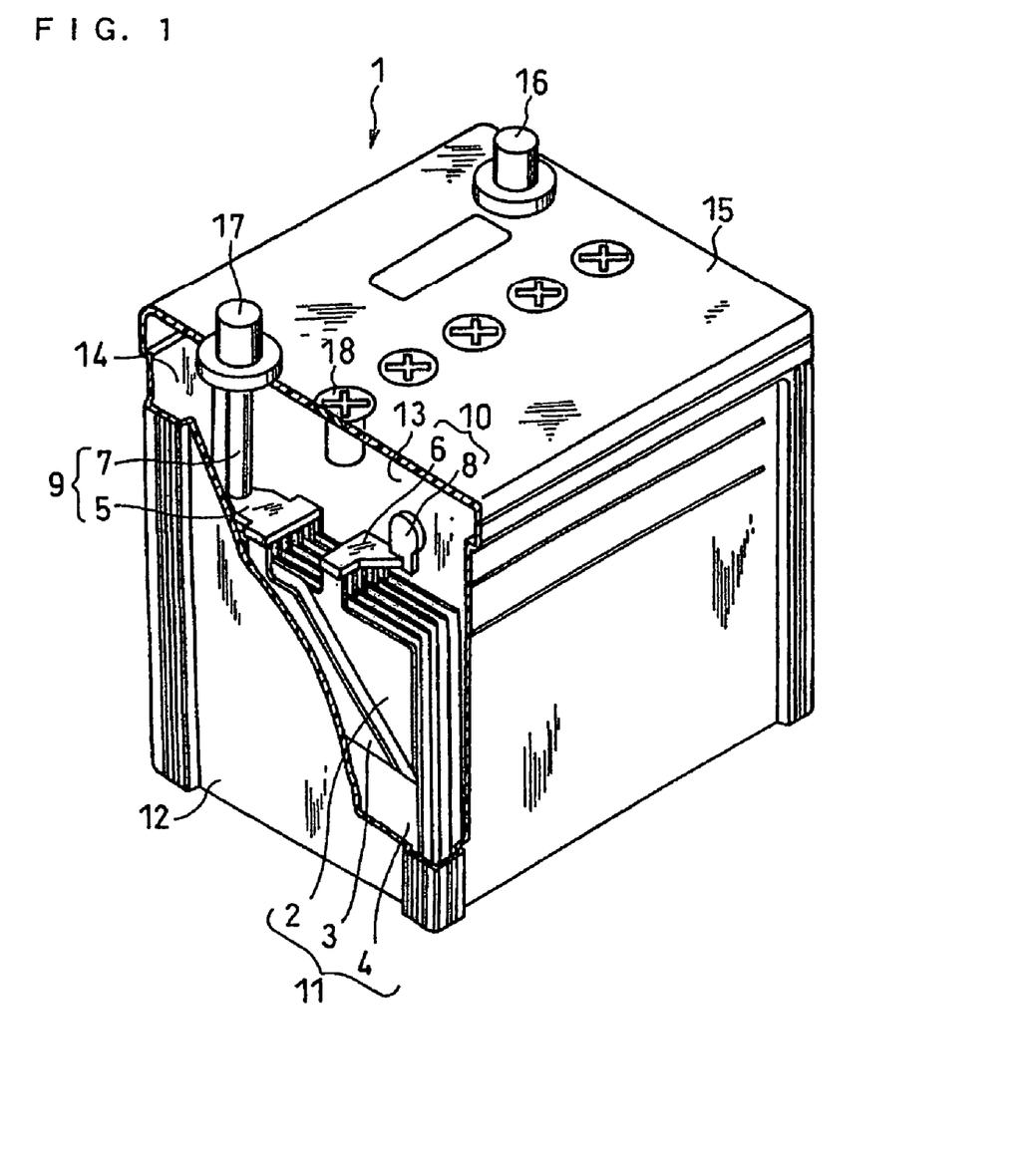
FIG. 1 A partially cut away perspective view of a lead storage battery of an Example of the present invention.

In the following, embodiments of the present invention are explained in detail. FIG. 1 is a partially cut away perspective view of a lead storage battery of the present invention.

A battery container 12 of a lead storage battery 1 is divided by partitions 13 to have a plurality of cell chambers 14, and an electrode plate pack 11 is stored in each cell chamber 14. The electrode plate pack 11 is structured by stacking up a plurality of positive electrode plates 2 and negative electrode plates 3 interposing separators 4 therebetween. The positive electrode plate 2 is connected to a positive electrode connecting member 10, and the negative electrode plate 3 is connected to a negative electrode connecting member 9.

In the electrode plate pack 11, a tab 22 of a positive electrode grid of the positive electrode plate 2 is connected to a positive electrode strap 6, and a tab 32 of a negative electrode grid of the negative electrode plate 3 is connected to a negative electrode strap 5. A positive electrode connecting body 8 connected with the positive electrode strap 6 of the electrode plate pack 11 in one cell chamber 14 is connected to a negative electrode connecting body connected to a negative electrode strap of an electrode plate pack 11 in an adjacent cell chamber 14, via a through hole provided in the partition 13. Thus, one electrode plate pack 11 is connected with another electrode plate pack 11 in an adjacent cell chamber 14 in series. A positive electrode pole is formed on a positive electrode strap at one end of the battery container 12, and a negative electrode pole 7 is formed on the negative electrode strap 5 on another end of the battery container 12.

Thus, the positive electrode connecting member 10 comprises the positive electrode strap 6 to which the tab 22 of the positive electrode grid is connected, and the positive electrode pole or the positive electrode connecting body 8 provided on the positive electrode strap 6; and the negative electrode connecting member 9 comprises the negative electrode strap 5 to which the tab 32 of the negative electrode grid is connected, and the negative electrode pole 7 or the negative electrode connecting body provided on the negative electrode strap 5.

A lid 15 provided with a positive electrode terminal 16 and a negative electrode terminal 17 is attached to an opening of the battery container 12. The positive electrode pole and the negative electrode pole are connected to the positive electrode terminal 16 and the negative electrode terminal 17, respectively. In a liquid inlet provided on the lid 15, a vent cap 18 having an opening for ventilation to eject a gas generated inside of the battery to the outside of the battery is attached.

Figure 2:
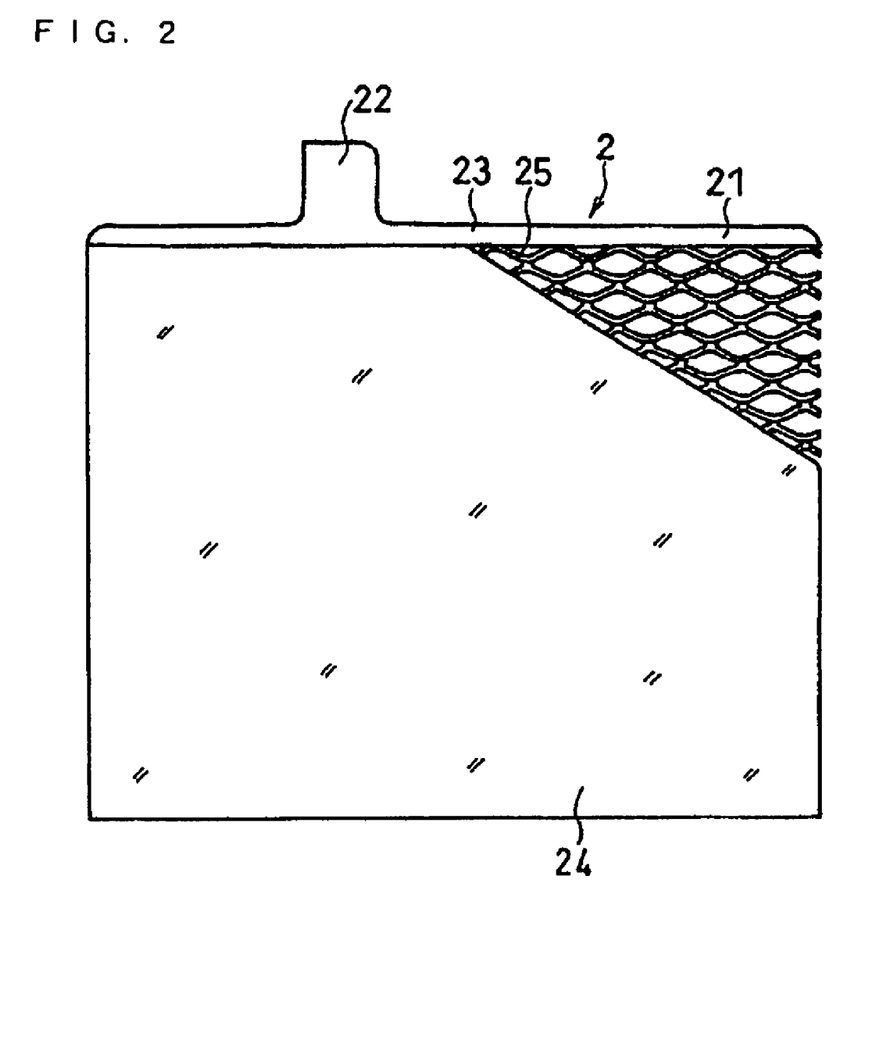
FIG. 2 A front view of a positive electrode plate of the same lead storage battery.

A front view of a positive electrode plate 2 is illustrated in FIG. 2.

The positive electrode plate 2 comprises a positive electrode grid 21 having a tab 22, and a positive electrode active material layer 24 retained by the positive electrode grid 21. The positive electrode active material layer 24 mainly comprises a positive electrode active material ($PbO_2$), and other than the positive electrode active material, the positive electrode active material layer 24 may include a small amount of a conductive material such as carbon, and a binder, for example. The positive electrode grid 21 is an expanded grid comprising an expanded mesh 25 retaining the positive electrode active material layer 24, a frame 23 provided on an upper edge of the expanded mesh 25, and the tab 22 connected to the frame 23.

The positive electrode grid 21 and the positive electrode connecting member 10 comprise a Pb-alloy including at least one of Ca and Sn.

For the Pb-alloy, a Pb—Sn alloy including 0.05 to 3.0% by mass of Sn, a Pb—Cb alloy including 0.01 to 0.10% by mass of Ca, or a Pb—Ca—Sn alloy including Ca and Sn may be used, in terms of corrosion resistance and mechanical strength.

The Pb alloy including at least one of Ca and Sn to be used for the positive electrode grid or the positive electrode connecting member does not include Sb substantially. However, Sb in an amount of approximately 0.001 to 0.002% by mass may be included as an impurity to an extent that would not give an adverse effect to a battery performance due to increases in amounts of electrolyte loss and self-discharging. When an Sb content in the positive electrode grid and the positive electrode connecting member is to the above extent, Sb will not move to the negative electrode plate.

Also, in order to improve corrosion resistance of the positive electrode grid, the lead-alloy of the positive electrode grid may include 0.01 to 0.08% by mass of Ba, and 0.001 to 0.05% by mass of Ag. When the lead-alloy including Ca is used, approximately 0.001 to 0.05% by mass of Al may be added in order to suppress oxidation and dissipation of Ca from molten lead alloy. Also, 0.0005 to 0.005% by mass of Bi may be included as an impurity. This is not detrimental to the effect of the present invention, and is acceptable.

Figure 3:
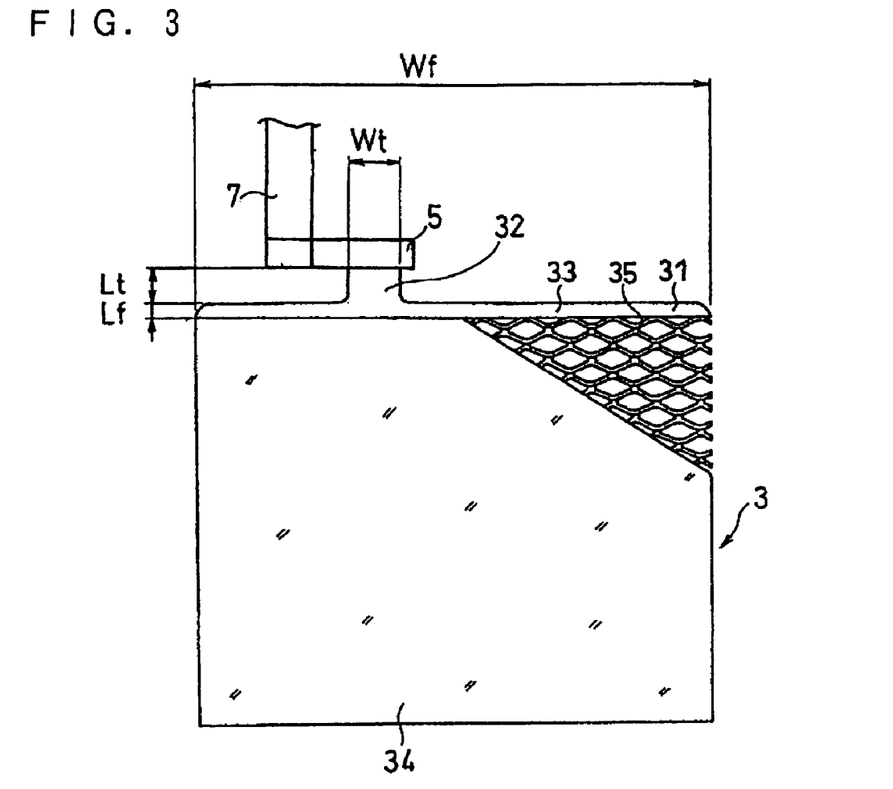
FIG. 3 A front view of a negative electrode plate of the same lead storage battery.

A front view of a negative electrode plate 3 is illustrated in FIG. 3.

The negative electrode plate 3 is formed of a negative electrode grid 31 having a tab 32, and a negative electrode active material layer 34 retained by the negative electrode grid 31. The negative electrode active material layer 34 mainly comprises a negative electrode active material (Pb), and may include, other than the negative electrode active material, a small amount of an expander such as lignin and barium sulfate, a conductive material such as carbon, or a binder. The negative electrode grid 31 is an expanded grid comprising an expanded mesh 35 in which the negative electrode active material layer 34 is retained, a frame 33 provided on an upper edge of the expanded mesh 35, and the tab 32 connected to the frame 33.

The negative electrode grid 31 and the negative electrode connecting member 9 comprise the same Pb-alloy not including Sb substantially as the positive electrode plate 2. However, a very small amount of Sb in less than 0.0001% by mass may be included in the Pb alloy as an impurity. Also, in the negative electrode plate 3, since acid resistance is not required compared with the positive electrode plate 2, pure Pb not including Sb substantially may be used for the negative electrode grid 31 and the negative electrode connecting member 9.

The positive electrode plate 2 and the negative electrode plate 3 may be obtained by a method illustrated below.

An unformed positive electrode plate can be obtained by filling a positive electrode paste, in which a raw material lead powder (a mixture of lead and lead oxide), sulfuric acid, water, and the like are mixed, into a positive electrode grid body, and then curing and drying, for example.

Also, an unformed negative electrode plate can be obtained by filling a negative electrode paste, in which a raw material lead powder (lead and lead oxide), sulfuric acid, water, and an expander such as lignin and barium sulfate are mixed, into a negative electrode grid body, and then curing and drying, for example. For the lignin, natural lignin (VANILLEX N manufactured by Nippon Paper Chemicals, for example) and synthetic lignin such as a condensed bisphenol-sulfonate (VISPERSE P215 manufactured by Nippon Paper Chemicals, for example) are used, for example.

Then, the above positive electrode plate 2 and negative electrode plate 3 are obtained by forming the unformed positive and negative electrode plates. The forming may be conducted within a battery container of a lead storage battery made by using unformed positive and negative electrode plates, or may be conducted before composing an electrode plate pack at the time of producing a lead storage battery.

The negative electrode active material layer 34 includes Sb. By including Sb which is lower in hydrogen overvoltage than the negative electrode active material into the negative electrode active material layer, a charge potential of the negative electrode plate increases, thereby drastically improving chargeability of the negative electrode plate. Also, since a lead storage battery of the present invention is structured to include Sb only in the negative electrode active material layer, Sb does not easily dissolute into the electrolyte, and corrosion of the negative electrode grid tab can be suppressed.

Especially, when the Sb content in the negative electrode active material layer is not less than 0.0002 parts by mass per 100 parts by mass of the negative electrode active material and Sb in total, service life properties are improved. Further, when the Sb content in the negative electrode active material layer is not less than 0.0004 parts by mass per 100 parts by mass of the negative electrode active material and Sb in total, service life properties are drastically improved. On the other hand, when the Sb content in the negative electrode active material layer becomes over 0.006 parts by mass per 100 parts by mass of the negative electrode active material and Sb in total, corrosion of the negative electrode grid tab gradually advances.

Therefore, it is preferable that the Sb content in the negative electrode active material layer is 0.0002 to 0.006 parts by mass per 100 parts by mass of the negative electrode active material and Sb in total. It is further preferable that the Sb content in the negative electrode active material layer is 0.0004 to 0.006 parts by mass per 100 parts by mass of the negative electrode active material and Sb in total.

Addition of Sb into the negative electrode active material layer can be conducted by adding Sb or a compound including Sb such as an oxide or sulfate of Sb, an antimonite, and the like into the negative electrode paste at the time of producing the negative electrode paste. Other than such, Sb can be electrodeposited on the negative electrode active material, by immersing the negative electrode plate in an electrolyte including Sb ion, for example, a dilute sulfic acid including antimony sulfate and antimonite, for electroplating.

The separator 4 includes silica ($SiO_2$).

In a lead storage battery of the present invention, it is assumed that a battery is over-discharged, and that charge/discharge is frequently repeated under a low SOC range, as in the above. Under such usage mode, corrosion of the negative electrode grid tab cannot be sufficiently suppressed, just by limiting the addition of Sb only to the negative electrode active material layer.

For such a problem, by including silica in the separator, corrosion of the negative electrode grid tab due to a deposit of Sb at the negative electrode grid tab can be suppressed, because the silica in the separator adsorbs Sb, even Sb is dissolved from the negative electrode active material layer under such usage mode.

Thus, service life properties of a lead storage battery in the above usage mode will be drastically improved, since the inclusion of Sb in the negative electrode plate improves chargeability, and the inclusion of silica in the separator suppresses corrosion of the negative electrode grid tab.

In a first preferred embodiment of the separator 4, the separator comprises a microporous synthetic resin sheet and silica particles dispersed in the synthetic resin sheet, and the content of the silica particles in the separator is 40 to 85% by mass. When the content of silica particles in the separator comprising the synthetic resin sheet including silica particles is less than 40% by mass, the effect to suppress the corrosion of the negative electrode grid tab slightly decreases. On the other hand, when the content of silica particles in the separator comprising the synthetic resin sheet including silica particles is over 85% by mass, the separator is weakened and becomes prone to crack and create holes, thereby easily inducing an internal short circuit of the battery.

Since a notable effect to suppress corrosion of the negative electrode grid tab can be obtained, as well as an effect to improve service life properties, it is preferable that the content of silica particles in the separator comprising the synthetic resin sheet including silica particles is 40 to 65% by mass.

For the synthetic resin, polyethylene and polypropylene can be mentioned, for example. Carbon may be included in the synthetic resin, in order to improve ion conductivity.

For silica particles, it is preferable that a porous silica having fine pores of an average pore diameter of not more than 20 μm, for example, is used, in order to easily adsorb Sb on a surface thereof. Also, it is preferable that a porous silica having a large specific surface area of approximately 200 $m^2/g$ is used. It is preferable that a particle diameter of the silica particles is 5 to 40 Mm.

The microporous synthetic resin sheet has electrolyte-permeable fine pores with a pore diameter of approximately 0.01 to 1 μm. When the diameter of the pore is over 1 μm, the active material easily passes through the separator. Such separator can be obtained by adding silica particles at the time of producing the microporous sheet comprising synthetic resin, for example.

In a second preferred embodiment of the separator 4, the separator comprises a fiber mat and silica particles retained by the fiber mat, and content of silica particles in the separator is 10 to 40% by mass. When the content of silica particles in the separator comprising the fiber mat retaining silica particles is less than 10% by mass, an effect to suppress corrosion of the negative electrode grid tab slightly decreases. On the other hand, when the content of silica particles in the separator comprising the fiber mat retaining silica particles is over 40% by mass, strength of the separator weakens due to a decrease in binding force of fibers, and a discharge voltage of the battery decreases due to an increase in internal resistance of the battery.

For the fiber, a glass fiber with a fiber diameter of 0.1 to 2 μm, or a polypropylene resin fiber and the like with a fiber diameter of 1 to 10 μm is used, for example. Such separator can be obtained by adding silica particles in a paper-making process at the time of producing a fiber mat, for example.

Each cell includes an electrolyte. And a positive electrode strap, a negative electrode strap, and an electrode plate pack are entirely immersed in the electrolyte. Since the negative electrode plate and the negative electrode strap do not contact with air, these are not easily oxidized. The present invention is not applied to a valve regulated lead storage battery which absorbs oxygen gas with a negative electrode plate, since the negative electrode active material layer includes Sb which is lower in hydrogen overvoltage than the negative electrode active material. When the present invention is applied to the valve regulated lead storage battery, based on a gas generation in small amount, an internal pressure of the battery increases, and the control valve stays open for a long period of time. As a result, air flows into the battery and the negative electrode plate becomes oxidized, thereby making the battery prone to deteriorate.

It is preferable that the positive electrode grid 21 has a lead alloy layer including Sn in at least a part of a surface thereof. This lead alloy layer improves chargeability of the positive electrode plate after a deep discharge or an over-discharge, leading to an improvement of service life properties. Also, a formation of passivated layer between an interface of the positive electrode active material and the positive electrode grid can be suppressed.

When the positive electrode grid includes Sn, it is preferable that an Sn content in the lead alloy layer is more than an Sn content in the positive electrode grid. For example, when 1.6% by mass of Sn is included in the positive electrode grid, it is preferable that the lead alloy layer includes at least not less than 1.6% by mass of Sn, and further preferably, the Sn content in the lead alloy layer is 3.0 to 6.0% by mass. When the Sn content in the lead alloy layer is less than the Sn content in the positive electrode grid, the effect of Sn noted above weakens, due to an existence of the lead alloy layer which is less in the Sn content at an interface of the positive electrode grid and the positive electrode active material.

The positive electrode grid having the lead alloy layer including Sn in at least a part of a surface thereof can be obtained as in the following, for example. A composite sheet comprising a base material layer and a lead alloy layer is obtained by supplying a base material sheet comprising a Pb alloy together with a lead-alloy foil including Sn between a pair of rollers, and pressing the lead alloy foil onto the base material sheet. At this time, the lead alloy foil is attached by pressing, to at least a part of the base material sheet where an expanded mesh is formed by an expanding mentioned later.

Next, the positive electrode grid is obtained by expanding the composite sheet. The preferable thickness of the base material layer in the composite sheet is 0.7 to 1.3 mm, and the preferable thickness of the lead alloy layer is 1 to 20 μm.

The separator 4 is a bag-shaped separator which is disposed to have an opening on the upper side, and the negative electrode plate 3 is stored so that the tab 32 of the negative electrode grid is positioned to the opening side.

Since the negative electrode plate is stored in the bag-shaped separator, even when Sb inside of the negative electrode active material is dissolved into the electrolyte, corrosion of the negative electrode grid tab due to a deposit of Sb at the negative electrode grid tab can be suppressed, because the dissolved Sb is captured by the bag-shaped separator rapidly and securely.

It is preferable that the separator 4 comprising the synthetic resin sheet including silica particles further includes 5 to 30% by mass of an oil. By including the oil in the separator, Sb is captured further securely. Additionally, oxidation resistance of the separator itself improves. For the oil, a mineral oil obtained by eliminating volatile contents, tar and pitch contents from petroleum can be used, for example. For the mineral oil, a paraffin-based mineral oil (a straight-chain saturated hydrocarbon) with a density of 0.85 to 0.90 g/cm$^3$ can be used, for example.

The separator including the oil can be obtained by adding the oil together with silica particles at the time of producing microporous synthetic resin sheet, for example.

Even though the oil partially flows out from the separator, the flowed oil moves to a liquid surface of the electrolyte positioned on an upper side than the electrode plate pack, and since the oil does not exist between the positive and negative electrode plates and electrolyte, it does not give an adverse effect to a battery performance.

When the oil content in the separator is below 5% by mass, the Sb capturing effect by the oil becomes insufficient. On the other hand, when the oil content in the separator becomes over 30% by mass, ion permeability of the separator is reduced, and an internal pressure of the battery increases. Also, the oil flowed out from the separator stains internal wall of the battery container, making it difficult to check a liquid surface of the electrolyte visually.

It is preferable that a mass ratio of the negative electrode active material (NAM) to the positive electrode active material (PAM) in the electrode plate pack 11 (hereinafter referred to as NAM/PAM) is 0.7 to 1.3. Based on such ratio, a dissolution of Sb in the negative electrode active material layer can be suppressed, even a deep discharge and an over-discharge are conducted while charge/discharge cycle, and corrosion of the negative electrode grid tab due to deposit of Sb to the negative electrode grid tab can be suppressed.

When NAM/PAM is below 0.7, the effect to suppress the dissolution of Sb in the negative electrode active material layer above will weaken. On the other hand, when NAM/PAM is over 1.3, the positive electrode plate deteriorates at the time of over-charge, making it prone to deteriorate the service life properties after over-charged state. Also, the amount of the negative electrode active material increases and adds weights of the battery, which is impractical.

It is further preferable that NAM/PAM is 0.82 to 1.08. When NAM/PAM is not less than 0.82, corrosion of the negative electrode grid tab barely advances. When NAM/PAM is over 1.08, cycle life properties after over-discharge slightly deteriorate.

In the negative electrode grid 31, which is an expanded grid, it is preferable that a ratio of the height of the tab 32 of the negative electrode grid (Lt) to the width of a frame 33 (Lf) (hereinafter referred to as Lt/Lf) illustrated in FIG. 3 is 2.2 to 15.0. The height of the tab 32 of the negative electrode grid Lt is, as shown in FIG. 3, a length of the tab 32 of the negative electrode grid from a base part connecting with the frame 33 to a bottom part of the negative electrode strap 5, when the tabs 32 of the negative electrode grid are collectively welded to the negative electrode strap 5.

When Lt/Lf is not more than 15.0, an amount of Sb deposited to the tab 32 of the negative electrode grid decreases, thereby making it possible to suppress corrosion of the tab 32 of the negative electrode grid. However, when Lt/Lf is over 15.0, Sb dissolved into the electrolyte became prone to deposit to the tab 32 of the negative electrode grid, thereby increasing an amount of corrosion of the tab 32 of the negative electrode grid.

The corrosion of the tab 32 of the negative electrode grid can be more suppressed when Lt/Lf is smaller. However, when the width Lf of the frame is made wider for making Lt/Lf further smaller, the height of the expanded mesh 35 becomes smaller, and an amount of the negative electrode active material decreases, thereby decreasing the battery capacity.

Additionally, when the height of the tab of the negative electrode grid Lt is made smaller, for making Lt/Lf smaller, it becomes easy to cause an internal short circuit, because the distances between the positive electrode plate 2 and the negative electrode strap 5, and between the negative electrode plate 3 and the positive electrode strap 6 become shorter.

In order to prevent a short circuit of the positive electrode plate and the negative electrode plate, the separator 4 is interposed in between the positive electrode plate 2 and the negative electrode plate 3 so that the upper end of the separator 4 is positioned higher than upper ends of the positive electrode plate 2 and the negative electrode plate 3. Therefore, the height Lt of the negative electrode grid tab cannot be set to become shorter than a distance between a lower side of the negative electrode strap 6 and an upper end of the separator 4.

Therefore, it is preferable that the lower limit of Lt/Lf is 2.2, in view of a prevention of a short circuit between the positive electrode plate and the negative electrode plate, the positive electrode plate and the negative electrode strap, and the negative electrode plate and the positive electrode strap, and in view of securing a battery capacity. It is further preferable that Lt/Lf is 2.2 to 12.0. When Lt/Lf is in such range, corrosion of the negative electrode grid tab is greatly suppressed, and service life properties are significantly improved.

Although in the above, it is structured to have the bag-shaped separator in which the negative electrode plate is stored, other than such structure, a synthetic resin sheet or a fiber mat may be folded to two (the letter-U shape) to insert the negative electrode plate in between.

Examples of the present invention are described in the following in detail.

EXAMPLE 1

(1) Fabrication of Bag-Shaped Separator

To polyethylene with an average molecular weight of 8000000, silica particles, a mineral oil (Daphne Oil CP, manufactured by Idemitsu Kosan Co., Ltd.), and carbon powder were added and then kneaded. After molding the kneaded matter by extrusion, the mineral oil was removed by a solvent such as hexane, to obtain a polyethylene sheet including silica particles, having fine pores of a pore diameter of not more than 1 μm, and having a thickness of 0.3 mm. The polyethylene sheet thus obtained was folded to two, and a bag-shaped separator with an opening only on an upper part was obtained by welding a left end side and a right end side of the folded sheet with heat.

For the silica particles, porous particles (a particle diameter: 5 to 40 μm) having fine pores with an average pore diameter of not more than 20 μm were used.

(2) Fabrication of Positive Electrode Plate

A positive electrode plate 2 shown in FIG. 2 was made as in the following.

A raw material lead powder (a mixture of lead and lead oxide), water, and dilute sulfuric acid were kneaded in a weight ratio of 100:15:5 to obtain a positive electrode paste.

Figure 4:
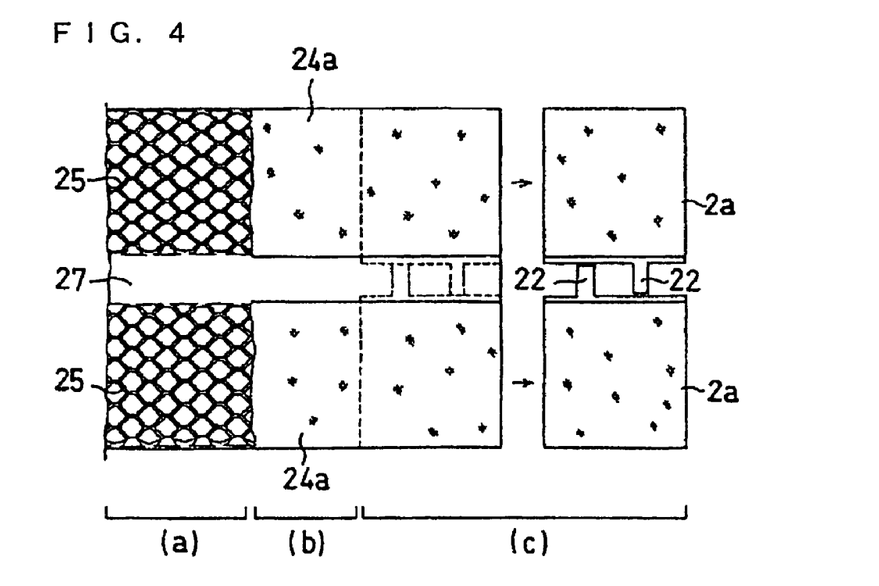
FIG. 4 An illustration of a step of expanding a base material sheet.

On the other hand, a base material sheet comprising a Pb alloy containing 0.07% by mass of Ca and 1.3% by mass of Sn obtained by casting was pressed to have a thickness of 1.1 mm. After predetermined slits were formed on the base material sheet 27, the slits were expanded to form an expanded mesh 25 (FIG. 4(a)), to obtain an expanded grid body (expansion process). A center part of the base material sheet 27 was not expanded, since the part was to be used for forming a tab 22 and a frame 23 of a positive electrode grid mentioned later.

A positive electrode paste 24a was filled into the expanded mesh 25 (FIG. 4(b)), and was cut and formed to have an electrode plate shape having the tab 22 of the positive electrode grid (FIG. 4(c)). The expanded grid thus cut and formed was cured and dried, to obtain an unformed positive electrode plate 2a (length: 115 mm, width: 137.5 mm). Then, the unformed positive electrode plate 2a was formed in a battery container, mentioned later, to obtain the positive electrode plate 2 in which the positive electrode grid 21 was retaining the positive electrode active material layer 24.

(3) Fabrication of Negative Electrode Plate

A negative electrode plate 3 shown in FIG. 3 was made as in the following.

A raw material lead powder, water, dilute sulfuric acid, natural lignin (VANILLEX N, manufactured by NIPPON PAPER CHEMICALS) as an expander, and a barium sulfate were mixed and kneaded in a weight ratio of 100:15:3.5:2.5:2.5, to obtain a negative electrode paste.

Then, a base material sheet comprising a Pb alloy containing 0.07% by mass of Ca and 0.25% by mass of Sn obtained by casting was pressed to have a thickness of 0.7 mm, and expanded in the same manner as the above. The expanded mesh was filled with the negative electrode paste, and an unformed negative electrode plate (length: 115 mm, width: 137.5 mm) was obtained in the same manner as in the above. Then, the unformed negative electrode plate was formed in a battery container, mentioned later, to obtain the negative electrode plate 3 in which the negative electrode grid 31 was retaining the negative electrode active material layer 34.

(4) Fabrication of Lead Storage Battery

A lead storage battery 1 with a structure shown in FIG. 1 was made by the following method. FIG. 1 is a partially cut away perspective view of a lead storage battery.

Six negative electrode plates 3 obtained in the above were respectively stored in the bag-shaped separator 4. The separators 4 storing the negative electrode plate 3 were alternately stacked with five positive electrode plates 2, i.e., the positive electrode plate 2 and the negative electrode plate 3 were stacked interposing the separator 4 in between, to obtain an electrode plate pack 11. Subsequently, the homopolar tabs 22 and the homopolar tabs 32 were respectively welded together, to obtain a positive electrode strap 6 and a negative electrode strap 5. Each of the electrode plate packs 11 was stored in six cell chambers 14 partitioned by partitions 13 in the battery container 12. Adjacent electrode plate packs were connected in series by connecting a positive electrode connecting body 8 connected to the positive electrode strap 6 with a negative electrode connecting body connected to the negative electrode strap. In this example, the connections between the electrode plate packs were made by through holes (not shown) provided at the partitions 13.

In the electrode plate packs connected in series positioned at both ends, a positive electrode pole was connected to one electrode plate pack, and a negative electrode pole 7 was connected to the other electrode plate pack. Then, a lid 15 was attached to an opening of the battery container 12, while a positive electrode terminal 16 and a negative electrode terminal 17 provided on the lid 15 were welded with the positive electrode pole and the negative electrode pole 7. Subsequently, 700 ml of sulfuric acid with a concentration of 34% by mass, as an electrolyte, was pored in each cell from a liquid inlet provided on the lid 15, and a formation was conducted in the battery container. After the formation, vent caps 18 having vent holes for ejecting a gas generated inside the battery to outside were fixed into the liquid inlet, to obtain a lead storage battery of 55D23 type (12V-48 Ah) (hereinafter referred to as a battery) specified in JIS D5301. After the formation, the electrode plate packs 11, the positive electrode strap 6, and the negative electrode strap 5 were entirely immersed in the electrolyte.

In fabrication of the separator above, the content of silica particles in the bag-shaped separator comprising a polyethylene sheet including silica particles was made to become 0% by mass, 35% by mass, 40% by mass, 65% by mass, or 85% by mass.

In producing the negative electrode paste above, a sulfate of Sb was added into the negative electrode paste, so that the Sb content in the negative electrode active material layer after completing the formation was 0 (less than the detection limit of 0.0001% by mass), 0.0002% by mass, 0.0004% by mass, 0.006% by mass, or 0.007% by mass per 100 parts by mass of the negative electrode active material and Sb in total.

For the positive electrode connecting member and the negative electrode connecting member, a Pb alloy containing 2.5% by mass of Sn, or a Pb alloy containing 2.5% by mass of Sb was used. As a result of a quantitative analysis for the amount of Sb, the Sb content in the Pb alloy containing 2.5% by mass of Sn was below the detection limit (0.0001% by mass).

The width Lf of the frame of the negative electrode grid was set to become 1.5 mm. The height Lt of the tab of the negative electrode grid after the tabs of negative electrode grid were welded together to the negative electrode strap was set to become 18 mm. That is, Lt/Lf was set to become 12.0. Also, the width of an electrode plate (Wf in FIG. 3) was set to become 137.5 mm, and the width of the tab of the negative electrode grid (Wt in FIG. 3) was set to become 10.0 mm.

Additionally, the ratio of the negative electrode active material (NAM) to the positive electrode active material (PAM) (NAM/PAM) was set to become 1.08.

Then, as shown in Tables 1 and 2, the separators comprising the polyethylene sheet including different amounts of silica particles, and the positive and negative electrode connecting members with different alloy compositions, and the negative electrode plate retaining the negative electrode active material layer with different amount of Sb content were used in various combinations to make batteries A1 to A5, B1 to B5, C1 to C5, D1 to D5, E1 to E5, F1 to F5, G1 to G5, H1 to H5, I1 to I5, and J1 to J5.

In Table 1, the batteries B2 to B5, C2 to C5, D2 to D5, and E2 to E5 are the batteries of Examples. Other batteries in Table 1 are the batteries of Comparative Examples. Table 1 shows the case where the Pb alloy containing 2.5% by mass of Sn was used for the positive and negative electrode connecting members in the batteries, and Table 2 shows the case where a Pb alloy containing 2.5% by mass of Sb was used for the positive and negative electrode connecting members in the batteries.

TABLE 1

| Battery No. | Silica Content in Separator (% by mass) | Sb Content in Negative Electrode Active Material Layer (parts by mass) | Corrosion Rate of Negative Electrode Grid Tab (%) | No. of Cycles (Cycle life) |
|---|---|---|---|---|
| A1 | 0 | 0(<0.0001) | 2.1 | 22500 |
| A2 | 0 | 0.0002 | 78.9 | 23900 |
| A3 | 0 | 0.0004 | 78.5 | 24200 |
| A4 | 0 | 0.006 | 80.6 | 25500 |
| A5 | 0 | 0.007 | 80.9 | 29000 |
| B1 | 35 | 0(<0.0001) | 2.0 | 22100 |
| B2 | 35 | 0.0002 | 2.4 | 36900 |
| B3 | 35 | 0.0004 | 3.0 | 68500 |
| B4 | 35 | 0.006 | 3.3 | 76800 |
| B5 | 35 | 0.007 | 9.2 | 66500 |
| C1 | 40 | 0(<0.0001) | 2.1 | 28200 |
| C2 | 40 | 0.0002 | 2.2 | 44300 |
| C3 | 40 | 0.0004 | 2.7 | 107000 |
| C4 | 40 | 0.006 | 2.9 | 107400 |
| C5 | 40 | 0.007 | 7.6 | 81000 |
| D1 | 65 | 0(<0.0001) | 2.0 | 27200 |
| D2 | 65 | 0.0002 | 2.1 | 45200 |
| D3 | 65 | 0.0004 | 2.4 | 110400 |
| D4 | 65 | 0.006 | 2.6 | 113000 |
| D5 | 65 | 0.007 | 7.2 | 105000 |
| E1 | 85 | 0(<0.0001) | 1.9 | 23900 |
| E2 | 85 | 0.0002 | 2.0 | 45900 |
| E3 | 85 | 0.0004 | 2.4 | 107200 |
| E4 | 85 | 0.006 | 2.5 | 107600 |
| E5 | 85 | 0.007 | 7.2 | 92100 |

TABLE 2

| Battery No. | Silica Content in Separator (% by mass) | Sb Content in Negative Electrode Active Material Layer (parts by mass) | Corrosion Rate of Negative Electrode Grid Tab (%) | No. of Cycles (Cycle Life) |
|---|---|---|---|---|
| F1 | 0 | 0(<0.0001) | 84.1 | 22400 |
| F2 | 0 | 0.0002 | 84.5 | 22300 |
| F3 | 0 | 0.0004 | 85.8 | 21000 |
| F4 | 0 | 0.006 | 88.2 | 21200 |
| F5 | 0 | 0.007 | 87.2 | 20400 |
| G1 | 35 | 0(<0.0001) | 81.3 | 23900 |
| G2 | 35 | 0.0002 | 82.3 | 21700 |
| G3 | 35 | 0.0004 | 82.7 | 21800 |
| G4 | 35 | 0.006 | 83.9 | 21500 |
| G5 | 35 | 0.007 | 87.3 | 21500 |
| H1 | 40 | 0(<0.0001) | 78.0 | 24400 |
| H2 | 40 | 0.0002 | 78.5 | 24500 |
| H3 | 40 | 0.0004 | 79.1 | 25200 |
| H4 | 40 | 0.006 | 80.2 | 25000 |
| H5 | 40 | 0.007 | 80.9 | 25900 |
| I1 | 65 | 0(<0.0001) | 79.3 | 26800 |
| I2 | 65 | 0.0002 | 80.2 | 25400 |
| I3 | 65 | 0.0004 | 81.8 | 25200 |
| I4 | 65 | 0.006 | 83.3 | 25000 |
| I5 | 65 | 0.007 | 85.1 | 26800 |
| J1 | 85 | 0(<0.0001) | 75.9 | 25500 |
| J2 | 85 | 0.0002 | 76.5 | 27400 |
| J3 | 85 | 0.0004 | 81.3 | 25900 |
| J4 | 85 | 0.006 | 82.2 | 27000 |
| J5 | 85 | 0.007 | 82.6 | 28100 |

As a result of a quantitative analysis for Sb amounts in the positive electrode grid, the positive electrode active material layer, and the negative electrode grid, it was found that the amounts of Sb were below the detention limit (0.0001% by mass) in any of the results.

The evaluations shown below were conducted for each battery thus obtained.

(5) Evaluations for Cycle Life Properties after Over-Discharge

A battery was discharged at a current of 10 A until a battery voltage became 10.5V under an ambient temperature of 25° C. Subsequently, the battery was stood still for 48 hours with a 12-watt bulb being connected in between the terminals, to over-discharge the battery. Then, the battery was charged for 8 hours at a constant current of 14.5V (maximum current 25 A).

Next, a cycle life test was conducted under the following conditions for the batteries after the over-discharge.

The weights of the batteries were measured before the cycle life test. A step of discharging the battery for 20 seconds at a current of 25 A under an ambient temperature of 25° C., and then charging for 40 seconds at a constant voltage of 14V (maximum charging current 25 A) was repeated 7200 times for charge/discharge cycles. Afterwards, the battery weight was measured again, and the amount of weight loss (WL) before and after the charge/discharge cycle was obtained. Then, the battery was discharged for 30 seconds at a current of 300 A. A discharging voltage at the $30^{th}$ second (hereinafter shown as V30) was obtained, and then water was supplemented in an amount of the weight loss of the battery.

V30 was obtained at every 7200th cycle, and the end of the service life of the battery was set to when V30 was reduced to 7.0V. Usually, in a lead storage battery for starting an engine, a light-load service life test is conducted, in which a step of discharging the battery for 4 minutes at a current of 25 A, and then charging for 10 minutes at a constant voltage (maximum current 25 A) was repeated (specified in JIS D5301). However, in this cycle life test, the test conditions were set by assuming a frequent charge/discharge at lower SOC compared with usual light-load service life test.

The number of cycles of battery life was obtained in the following method. When V30 obtained in $n^{th}$ time (a number of charge/discharge cycle is obtained by 7200×n) became 7.0V or less for the first time, the V30 is set as Vn, and the previous (n−1) V30 is set as Vn−1. Then, in a graph setting a vertical axis as V30, and a horizontal axis as a number of charge/discharge cycle, coordinates (7200(n−1), Vn−1) and coordinates (7200 n, Vn) are connected with a liner line, and the value of the horizontal axis at a point of intersection of this line and V30=7.0 was made the number of cycles (cycle life).

(6) Measurement of Corrosion Rate of Negative Electrode Grid Tab

The batteries completed the life test were disassembled, and corrosion rate of the negative electrode grid tab was obtained by measuring the thickness of the thinnest part of the negative electrode grid tab. The thickness of the thinnest part of the negative electrode grid tab was obtained by cutting a center part in the widthwise direction, and measuring a thinnest part with a microscope. Then, corrosion rate (%) of the negative electrode grid tab was calculated with the formula (T−TE)/T×100, by setting the thickness of the tab of the negative electrode grid in the original state as T, and setting the thickness of the negative electrode grid tab after the life test as TE.

The results of the test are shown in Tables 1 and 2.

As shown in Table 2, when the Pb alloy containing 2.5% by mass of Sb was used, in any of the batteries, corrosion rate of the negative electrode grid tab was high and the number of cycles was 20000 to 30000 cycles. This is probably because Sb included in the positive and negative electrode connecting members is dissolved into the electrolyte, and the dissolved Sb is deposited to the negative electrode grid tab. These batteries were disassembled, and as a result of a quantitative analysis, it was found that approximately 0.0006% by mass of Sb existed in the negative electrode grid tab.

As shown in Table 1, in batteries B2 to B5, C2 to C5, D2 to D5, and E2 to E5 of the present invention, in which the positive and negative electrode connecting members comprising the Pb alloy containing 2.5% by mass of Sn, the negative electrode active material layer including Sb, and the separator comprising the polyethylene sheet including silica particles were used, corrosion rate of the negative electrode grid tab decreased, and the number of the cycles was increased, compared with the batteries A1 to A5, B1, C1, D1, and E1 of Comparative Examples.

The improvement in the cycle life properties was probably based on an improvement of chargeability of the negative electrode plate by the inclusion of Sb in the negative electrode active material layer. Also, although these batteries were disassembled and as a result of a quantitative analysis for Sb in the negative electrode grid tab, Sb over the detection limit (0.0001% by mass) was not detected from the negative electrode grid tab.

The corrosion of the negative electrode grid tab was probably suppressed because Sb ion dissolved into the electrolyte was captured by the silica particles included in the separator, thereby suppressing a diffusion of Sb ion to the proximity of the negative electrode grid tab, and suppressing a deposition of Sb to the negative electrode grid tab.

Since Sb ion adsorbed on a surface of the silica particles deposits on a surface of the negative electrode active material in proximity of the separator while charging the battery, the effect of the improvement of the chargeability can be continuously obtained by including Sb in the negative electrode plate.

In the batteries A2 to A5 of Comparative Example using the separator not including the silica particles and the negative electrode active material layer including Sb, the number of cycles (cycle life) was below 30000 cycles, because corrosion rate of the negative electrode grid tab significantly increased by an advancement of the corrosion of the negative electrode grid tab, and current collecting properties of the negative electrode plate declined. This is probably because Sb dissolved from the negative electrode active material layer due to over-discharge before the battery life test was deposited to the negative electrode grid tab, and with the repeated charge/discharge, corrosion of the negative electrode grid tab was advanced by Sb deposited to the negative electrode grid tab.

In the batteries B1, C1, D1, and E1 of Comparative Example using the separator including the silica particles and the negative electrode active material layer not including Sb, while corrosion of the negative electrode grid tab was barely advanced, the service life properties were reduced. Upon disassembling the batteries which completed the battery life test, it was found that lead sulfate produced by the discharge was accumulated. Thus, it was confirmed that the cause for the battery to reach its life limit was the decline of chargeability.

When the Sb content in the negative electrode active material layer was 0.0002 parts by mass per 100 parts by mass of the negative electrode active material and Sb in total, the service life properties were improved. And when the Sb content in the negative electrode active material layer was not less than 0.0004 parts by mass per 100 parts by mass of the negative electrode active material and Sb in total, the service life properties improved significantly. However, when the Sb content in the negative electrode active material layer was 0.007 parts by mass per 100 parts by mass of the negative electrode active material and Sb in total, the corrosion rate of the negative electrode grid tab was increased. From the above, it can be concluded that the Sb content in the negative electrode active material layer is preferably 0.0002 to 0.006 parts by mass per 100 parts by mass of the negative electrode active material and Sb in total.

When the silica particles content in the separator comprising the polyethylene sheet including the silica particles is not less than 35% by mass, service life properties were improved, and corrosion of the negative electrode grid tab was suppressed. Especially, when the silica particles content in the separator comprising the polyethylene sheet including the silica particles is 40 to 85% by mass, significant improvements in service life properties and in suppression of corrosion of the negative electrode grid tab were achieved. When the silica particles content in the separator comprising the polyethylene sheet including the silica particles is over 85% by mass, although the above effect was obtained, the separator intensity declined, and handling properties during manufacturing steps became inferior. From the above, it can be concluded that the silica particles content in the separator comprising the polyethylene sheet including the silica particles is preferably 40 to 85% by mass.

EXAMPLE 2

A glass fiber mat with a thickness of 1.0 mm retaining silica particles was obtained by papermaking process of a glass fiber in an acidic aqueous solution in which silica particles were dispersed. Then, the obtained glass fiber mat was folded to two, and a bag-shaped separator with an opening only on top was made by welding a left end part and a right end part by heating. At this time, the silica particle content in the separator comprising the glass fiber mat retaining the silica particles was set to become 0% by mass, 5% by mass, 10% by mass, 40% by mass, and 50% by mass. For the silica particles, the same silica particles as in Example 1 were used.

As shown in Tables 3 and 4, batteries K1 to K5, L1 to L5, M1 to M5, N1 to N5, O1 to O5, P1 to P5, Q1 to Q5, R1 to R5, S1 to S5, and T1 to T5 were made in the same manner as in Example 1, by combining the separators comprising the glass fiber mat retaining the silica particles with different silica particle contents, the negative active material layer with different amounts of Sb content, and the positive and negative electrode connecting members with different alloy compositions.

The batteries L2 to L5, M2 to M5, N2 to N5, and O2 to O5 in Table 3 are the batteries of Examples, and other batteries in Table 3 and the batteries in Table 4 are the batteries of Comparative Examples. The batteries in Table 3 show a case where the Pb alloy containing 2.5% by mass of Sn was used for the positive and negative electrode connecting members, and the batteries in Table 4 show a case where the Pb alloy containing 2.5% by mass of Sb was used for the positive and negative electrode connecting members.

TABLE 3

| Battery No. | Silica Content in Separator (% by mass) | Sb Content in Negative Electrode Active Material Layer (parts by mass) | Corrosion Rate of Negative Electrode Grid Tab (%) | No. of Cycles (Cycle Life) |
|---|---|---|---|---|
| K1 | 0 | 0(<0.0001) | 2.1 | 19800 |
| K2 | 0 | 0.0002 | 81.7 | 20600 |
| K3 | 0 | 0.0004 | 81.2 | 21200 |
| K4 | 0 | 0.006 | 83.2 | 22800 |
| K5 | 0 | 0.007 | 82.3 | 23000 |
| L1 | 5 | 0(<0.0001) | 2.1 | 20600 |
| L2 | 5 | 0.0002 | 2.3 | 53600 |
| L3 | 5 | 0.0004 | 3.0 | 74300 |
| L4 | 5 | 0.006 | 3.2 | 85400 |
| L5 | 5 | 0.007 | 9.8 | 72600 |
| M1 | 10 | 0(<0.0001) | 2.1 | 22200 |
| M2 | 10 | 0.0002 | 2.1 | 99100 |
| M3 | 10 | 0.0004 | 2.6 | 102200 |
| M4 | 10 | 0.006 | 2.9 | 119100 |
| M5 | 10 | 0.007 | 7.8 | 128100 |
| N1 | 40 | 0(<0.0001) | 2.0 | 24820 |
| N2 | 40 | 0.0002 | 2.0 | 112200 |
| N3 | 40 | 0.0004 | 2.4 | 129000 |
| N4 | 40 | 0.006 | 2.5 | 128700 |
| N5 | 40 | 0.007 | 7.2 | 123400 |
| O1 | 50 | 0(<0.0001) | 1.9 | 17600 |
| O2 | 50 | 0.0002 | 2.1 | 63400 |
| O3 | 50 | 0.0004 | 2.3 | 108900 |
| O4 | 50 | 0.006 | 2.5 | 107500 |
| O5 | 50 | 0.007 | 7.0 | 82700 |

TABLE 4

| Battery No. | Silica Content in Separator (% by mass) | Sb Content in Negative Electrode Active Material Layer (parts by mass) | Corrosion Rate of Negative Electrode Grid Tab (%) | No. of Cycles (Cycle Life) |
|---|---|---|---|---|
| P1 | 0 | 0(<0.0001) | 83.2 | 25800 |
| P2 | 0 | 0.0002 | 84.1 | 23700 |
| P3 | 0 | 0.0004 | 88.6 | 20300 |
| P4 | 0 | 0.006 | 84.3 | 22000 |
| P5 | 0 | 0.007 | 85.4 | 21600 |
| Q1 | 5 | 0(<0.0001) | 78.3 | 23800 |
| Q2 | 5 | 0.0002 | 79.2 | 22350 |
| Q3 | 5 | 0.0004 | 82.8 | 20680 |
| Q4 | 5 | 0.006 | 83.7 | 21820 |
| Q5 | 5 | 0.007 | 89.5 | 21730 |
| R1 | 10 | 0(<0.0001) | 77.0 | 23600 |
| R2 | 10 | 0.0002 | 77.5 | 25000 |
| R3 | 10 | 0.0004 | 80.4 | 26040 |
| R4 | 10 | 0.006 | 82.6 | 25700 |
| R5 | 10 | 0.007 | 82.6 | 25960 |
| S1 | 40 | 0(<0.0001) | 79.2 | 26300 |
| S2 | 40 | 0.0002 | 80.9 | 25700 |
| S3 | 40 | 0.0004 | 81.5 | 25520 |
| S4 | 40 | 0.006 | 83.5 | 24640 |
| S5 | 40 | 0.007 | 87.7 | 26920 |
| T1 | 50 | 0(<0.0001) | 76.1 | 27450 |
| T2 | 50 | 0.0002 | 78.6 | 28510 |
| T3 | 50 | 0.0004 | 76.4 | 25960 |
| T4 | 50 | 0.006 | 77.2 | 28240 |
| T5 | 50 | 0.007 | 79.7 | 28240 |

For each battery, the cycle life test after over-charging was conducted and a corrosion rate of the negative electrode grid tab was measured under the same test conditions with Example 1. The results of these tests are shown in Tables 3 and 4.

As shown in Table 4, when the Pb alloy containing 2.5% by mass of Sb was used for the positive and negative electrode connecting members, the corrosion rate of the negative electrode grid tab was high, and a number of cycles (cycle life) was about below 30000 cycles, and corrosion of the negative electrode grid the tab advanced in any battery. This is probably because Sb included in the positive and negative electrode connecting members dissolved in the electrolyte, and the dissolved Sb deposited on the negative electrode grid tab, as in Example 1. Upon disassembling these batteries, and conducting a quantitative analysis for Sb at the negative electrode grid tab, it was found that about 0.0005% by mass of Sb was found at the negative electrode grid the tab.

As shown in Table 3, in the batteries L2 to L5, M2 to M5, N2 to N5, and O2 to O5 of the present invention using the positive and negative electrode connecting members comprising the Pb alloy containing 2.5% by mass of Sn, the negative electrode active material layer including Sb, and the separator comprising the glass fiber mat retaining the silica particles, the corrosion rate of the negative electrode grid tab decreased, and a number of cycles (cycle life) was increased, compared with the batteries K1 to K5, L1, M1, N1, and O1 of the Comparative Examples. Upon disassembling these batteries, and conducting a quantitative analysis for Sb at the negative electrode grid tab, it was found that Sb over the detection limit (0.0001% by mass) was not found at the negative electrode grid tab.

In the batteries K2 to K5 of Comparative Examples using the separator not including the silica particles, and the negative electrode active material layer including Sb, a number of cycles (cycle life) was below 30000, based on a significant increase in the corrosion rate of the negative electrode grid tab due to advancement of corrosion of the negative electrode grid tab, and decline in current collecting properties of the negative electrode plate.

In the batteries L1, M1, N1, and O1 of Comparative Example using the separator including the silica particles, and the negative electrode active material layer not including Sb, although corrosion of the negative electrode grid tab barely advanced, service life properties declined due to decline in chargeability.

When the silica particle content in the separator comprising the glass fiber mat retaining the silica particles was not less than 5% by mass, service life properties improved, and corrosion of the negative electrode grid tab was suppressed. Especially, when the silica particle content in the separator comprising the glass fiber mat retaining the silica particles was 10 to 40% by mass, effects of an improvement of service life properties, and suppression of corrosion of the negative electrode grid tab were achieved significantly. In a battery with 50% by mass silica particle content in the separator comprising the glass fiber mat retaining the silica particles, a number of cycles during battery life slightly decreased. From the above, it can be concluded that silica particle content in the separator comprising the glass fiber mat retaining the silica particles is preferably 10 to 40% by mass.

When the Sb content in the negative electrode active material layer was not less than 0.0002 parts by mass per 100 parts by mass of the negative electrode active material and Sb in total, service life properties improved. Especially, when the Sb content in the negative electrode active material layer was not less than 0.0004 per 100 parts by mass of the negative electrode active material and Sb in total, service life properties improved significantly. However, when the Sb content in the negative electrode active material layer was 0.007 parts by mass per 100 parts by mass of the negative electrode active material and Sb in total, corrosion rate of the negative electrode grid tab increased. From the above, it can be concluded that the Sb content in the negative electrode active material layer is preferably 0.0002 to 0.006 parts by mass per 100 parts by mass of the negative electrode active material and Sb in total.

In comparison with the batteries of the present invention using the separator comprising the polyethylene sheet including the silica particles in Example 1, the batteries of the present invention using the separator comprising the glass fiber mat retaining the silica particles in Example 2 achieved more effects to suppress the corrosion of the negative electrode grid tab even with a small amount of silica particles.

The following can be guessed. In the separator comprising the polyethylene sheet including the silica particles, silica particles are dispersed in the polyethylene sheet. Therefore, much part of the silica particles are covered by polyethylene, and Sb ion cannot be adsorbed by such covered part. On the other hand, in the separator comprising the glass fiber mat retaining the silica particles, silica particles are dispersed on a surface of the fiber. Therefore, Sb ion can be adsorbed by much part of a surface of the silica particles.

EXAMPLE 3

Figure 5:
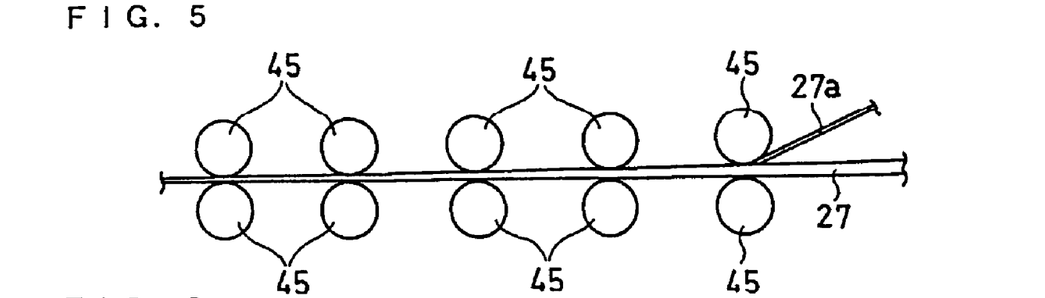
FIG. 5 An illustration of a step of obtaining a composite sheet used for producing a grid body.

As shown in FIG. 5, a lead alloy foil 27a was supplied with a base material sheet 27 in between a pair of rollers 45, and the base material sheet 27 and the lead alloy foil 27a were simultaneously pressed by the rollers, in a pressing step of a positive electrode grid fabrication. By this pressing process, the lead alloy foil 27a was attached onto the base material sheet 27, and a composite sheet having a lead alloy layer with a thickness of 20 μm on one side of the base material sheet with a thickness of 1.1 mm was obtained. A Pb alloy containing 5.0% by mass of Sn was used for the lead alloy foil 27a. The same positive electrode grid as in Example 1 was used for the base material sheet 27.

For the part of the base material sheet 27 where the lead alloy foil 27a is to be pressed onto, only a part where an expanded mesh and a frame are to be formed in an expanding process mentioned later was pressed, and the lead alloy foil was not pressed onto a center part of the base material sheet 27 where a tab 22 of the positive electrode grid is to be formed, as shown in FIG. 4.

Figure 6:
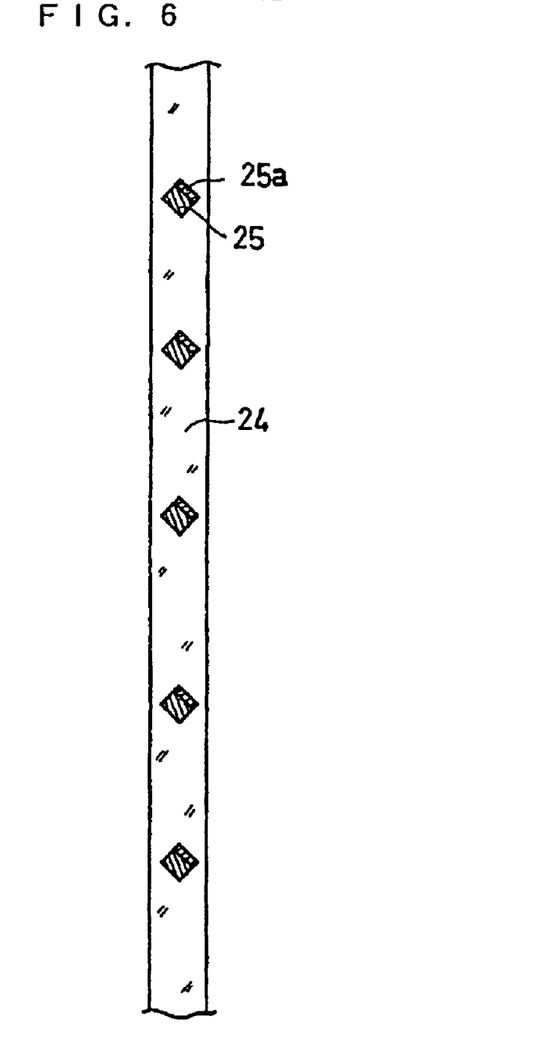
FIG. 6 A longitudinal sectional view showing a portion of a positive electrode plate using a positive electrode grid body having a lead alloy layer on a surface thereof.

A positive electrode plate was obtained in the same manner as in Example 1, except that an expansion process was conducted for the composite sheet. The positive electrode grid in the positive electrode plate have an alloy layer 25a comprising the Pb alloy containing 5% by mass of Sn on one side of an expanded mesh 25 having a rhombic cross section, as shown FIG. 6.

A battery C8 having the same structure with C3 was made except that the positive electrode plate obtained above was used.

A battery C7 having the same structure with C8 was made except that the bag-shaped separator stored the positive electrode plate instead of the negative electrode plate.

A battery C6 having the same structure with C3 was made except that the bag-shaped separator stored the positive electrode plate instead of the negative electrode plate.

Batteries M6 to M8 having the same structure with the batteries C6 to C8 were respectively made except that the separator comprising the glass fiber mat retaining the silica particles of the battery M3 was used instead of the separator comprising polyethylene sheet including the silica particles of the battery C3.

The test results are shown in Table 5.

TABLE 5

| Battery No. | Separator Composing Material | Stored Electrode Plate | Lead Alloy Layer on Positive Electrode Grid Surface | Corrosion Rate of Negative Electrode Grid (%) | No. Of Cycles (Cycle Life) |
|---|---|---|---|---|---|
| C6 | Polyethylene | Positive Electrode | Without | 79.6 | 25600 |
| C7 | Polyethylene | Positive Electrode | With | 81.1 | 26600 |
| C3 | Polyethylene | Negative Electrode | Without | 2.7 | 107000 |
| C8 | Polyethylene | Negative Electrode | With | 2.8 | 153000 |

TABLE 5-continued

| Battery No. | Separator Composing Material | Stored Electrode Plate | Lead Alloy Layer on Positive Electrode Grid Surface | Corrosion Rate of Negative Electrode Grid (%) | No. Of Cycles (Cycle Life) |
|---|---|---|---|---|---|
| M6 | Glass Fiber | Positive Electrode | Without | 80.0 | 20100 |
| M7 | Glass Fiber | Positive Electrode | With | 82.6 | 22300 |
| M3 | Glass Fiber | Negative Electrode | Without | 2.6 | 102200 |
| M8 | Glass Fiber | Negative Electrode | With | 2.7 | 144000 |

When there was the lead alloy layer including Sn on one side of the positive electrode grid, a formation of a passivated layer at an interface of the positive electrode grid and the active material was suppressed, thereby improving charge-ability of the positive electrode plate, and increasing the number of cycles (cycle life).

Also, since diffusion of Sb are more suppressed when the negative electrode plate was stored in the bag-shaped separator instead of the positive electrode plate, corrosion rate of the negative electrode grid tab due to deposition of Sb to the negative electrode grid tab was low.

EXAMPLE 4

Batteries C9 to C13 having the same structure with the battery C3 were made except that amounts of a positive electrode paste and of a negative electrode paste to be filled were adjusted so that a mass ratio of a negative electrode active material to a positive electrode active material (NAM/PAM) in an electrode plate pack satisfies a value shown in Table 6.

Also, batteries M9 to M13 having the same structure with the battery C9 to C13 were made except that the separator comprising a glass fiber mat retaining the silica particles of the battery M3 was used instead of the separator comprising the polyethylene sheet including the silica particles of the battery C3.

The test results of the batteries are shown in Table 6.

TABLE 6

| Battery No. | Composing Material for Separator | NAM/PAM | Corrosion Rate of Negative Electrode Grid Tab (%) | No. of Cycles (Cycle Life) |
|---|---|---|---|---|
| C9 | Polyethylene | 0.6 | 83.7 | 22200 |
| C10 | Polyethylene | 0.7 | 2.9 | 99300 |
| C11 | Polyethylene | 0.82 | 2.8 | 99900 |
| C3 | Polyethylene | 1.08 | 2.7 | 107000 |
| C12 | Polyethylene | 1.3 | 2.5 | 98000 |
| C13 | Polyethylene | 1.35 | 2.2 | 96900 |
| M9 | Glass Fiber | 0.6 | 81.2 | 21200 |
| M10 | Glass Fiber | 0.7 | 2.9 | 97600 |
| M11 | Glass Fiber | 0.82 | 2.8 | 98300 |
| M3 | Glass Fiber | 1.08 | 2.6 | 102200 |
| M12 | Glass Fiber | 1.3 | 2.5 | 101000 |
| M13 | Glass Fiber | 1.35 | 2.5 | 99000 |

When NAM/PAM was 0.7 to 1.3, excellent service life properties were obtained while corrosion of the negative electrode plate tab was being suppressed. Especially, when NAM/PAM was 0.82 to 1.08, the effects of suppressing corrosion of the negative electrode grid tab and improvement of service life properties were notably achieved.

When NAM/PAM was 0.6, the number of cycles (cycle life) dropped to 20000 to 30000 because corrosion of the negative electrode grid tab advanced and current collecting properties of the negative electrode plate declined. This is probably because Sb dissolved from the negative electrode active material layer due to the over-discharge before the life test deposited on the negative electrode grid tab.

On the other hand, when NAM/PAM was 1.35, although corrosion of the negative electrode grid tab was slightly less, service life properties did not improve much. This is probably because of a decrease in positive electrode capacity due to an over-discharge.

EXAMPLE 5

Mineral oils (Daphne Oil CP, manufactured by Idemitsu Kosan Co., Ltd.) were included in separators comprising the polyethylene sheet including the same silica particles as in the battery C3 in various proportions shown in Table 7. Batteries C14 to C17 having the same structure with the Battery C3 were respectively made, except that these separators were used.

The test results are shown in Table 7.

TABLE 7

| Battery No. | Oil Content in Separator (% by mass) | Corrosion of Negative Electrode Grid Tab (%) | No. of Cycles (Cycle Life) |
|---|---|---|---|
| C3 | 0 | 2.7 | 107000 |
| C14 | 5 | 2.7 | 109000 |
| C15 | 10 | 2.5 | 110100 |
| C16 | 30 | 2.2 | 99400 |
| C17 | 40 | 2.0 | 34500 |

When the oil content in the separator was 5 to 30% by mass, since oil captured Sb dissolved from the negative electrode active material layer, corrosion of the negative electrode grid tab based on Sb was further suppressed. When the oil content in the separator became over 30% by mass, although the Sb-capturing effect could be obtained, service life properties declined because the fine pores of the separator were closed by the oil, ion permeability of the separator declined, and internal resistance of the battery increased.

EXAMPLE 6

Batteries C18 to C21 having the same structure as the battery C3 were made except that sizes of a tab and a frame of a negative electrode grid were variously changed so that a ratio of a width Lf of a frame 33 in the negative electrode grid after collective welding of the tab of the negative electrode grid to a negative electrode strap to a height Lt of a tab 32 of the negative electrode grid (Lt/Lf) satisfies the values shown in Table 8.

Also, batteries M18 to M21 having the same structure with C 18 to 21 were made except that the separator of the battery M3 was used instead of the separator of the battery C3. In making limitation on a height of the batteries, these batteries were made to satisfy the equation Lt+Lf=30.0 mm.

Also, batteries C18' to C21' and M18' to M21' having the same structure with the batteries C18 to C21 and M18 to M21 above were made respectively, except that a width (Wt in FIG. 3) of the negative electrode grid tab was made to become 15.0 mm. The test results of these batteries are shown in Tables 8 and 9.

TABLE 8

| Battery No. | Composing Material of Separator | Lt/Lf | Corrosion Rate of Negative Electrode Grid Tab (%) | No. of Cycles (Cycle Life) |
| --- | --- | --- | --- | --- |
| C18 | Polyethylene | 2.2 | 2.6 | 96200 |
| C19 | Polyethylene | 7.5 | 2.8 | 96500 |
| C3 | Polyethylene | 12.0 | 2.7 | 107000 |
| C20 | Polyethylene | 15.0 | 2.9 | 97100 |
| C21 | Polyethylene | 20.0 | 83.2 | 24000 |
| M18 | Glass Fiber | 2.2 | 2.6 | 95800 |
| M19 | Glass Fiber | 7.5 | 2.6 | 96000 |
| M3 | Glass Fiber | 12.0 | 2.6 | 102200 |
| M20 | Glass Fiber | 15.0 | 3.2 | 98300 |
| M21 | Glass Fiber | 20.0 | 80.3 | 23400 |

TABLE 9

| Battery No. | Composing Material of Separator | Lt/Lf | Corrosion Rate of Negative Electrode Grid Tab (%) | No. of Cycles (Cycle Life) |
| --- | --- | --- | --- | --- |
| C18' | Polyethylene | 2.2 | 2.7 | 96000 |
| C19' | Polyethylene | 7.5 | 2.7 | 97200 |
| C3' | Polyethylene | 12.0 | 2.7 | 103400 |
| C20' | Polyethylene | 15.0 | 3.0 | 98200 |
| C21' | Polyethylene | 20.0 | 82.9 | 24300 |
| M18' | Glass Fibers | 2.2 | 2.9 | 92600 |
| M19' | Glass Fibers | 7.5 | 3.0 | 93400 |
| M3' | Glass Fibers | 12.0 | 3.0 | 99300 |
| M20' | Glass Fibers | 15.0 | 4.2 | 97300 |
| M21' | Glass Fibers | 20.0 | 81.3 | 24700 |

When Lt/Lf is 2.2 to 15.0, corrosion rate of the negative electrode grid tab decreased, and corrosion of the negative electrode grid tab was suppressed. Additionally, the number of cycles (cycle life) was increased, and service life properties were improved. Especially, corrosion of the negative electrode grid tab was suppressed when Lt/Lf was not more than 12.0. Such a tendency was the same for any of the cases when a width (Wt) of the negative electrode grid tab was 10.0 mm and 15.0 mm. Thus, it was found that a width of the negative electrode grid tab hardly affects corrosion of the tab of the negative electrode grid and service life properties.

INDUSTRIAL APPLICABILITY

A lead storage battery of the present invention is suitably used for vehicles and the like which carry a stop-and-go-system and a regenerative-braking-system, because of its excellent service life properties under a usage mode in which charge/discharge is repeated under a low SOC range.

The invention claimed is:

1. A lead storage battery including:
an electrode plate pack comprising a plurality of negative electrode plates which each comprise a negative electrode grid having a tab and a negative electrode active material layer retained by said negative electrode grid, a plurality of positive electrode plates which each comprise a positive electrode grid having a tab and a positive electrode active material layer retained by said positive electrode grid, and a plurality of separators separating said positive electrode plate and said negative electrode plate;
a positive electrode connecting member comprising a positive electrode strap to which said tab of each positive electrode plate of the electrode plate pack is connected, and a positive electrode pole or a positive electrode connecting body provided at said positive electrode strap; and
a negative electrode connecting member comprising a negative electrode strap to which said tab of each negative electrode plate of the electrode plate pack is connected, and a negative electrode pole or a negative electrode connecting body provided at said negative electrode strap,
wherein said positive electrode grid, said negative electrode grid, said positive electrode connecting member, and said negative electrode connecting member comprise a Pb-alloy including at least one of Ca and Sn,
said negative electrode active material layer includes Sb,
said separator includes silica and contains 5.0 to 30% by mass of an oil, and
said electrode plate pack, said positive electrode strap, and said negative electrode strap are immersed in an electrolyte such that the level of the electrolyte is always above the electrode plate pack, the positive electrode strap and the negative electrode strap.

2. The lead storage battery in accordance with claim 1, wherein said separator comprises a microporous synthetic resin sheet and silica particles dispersed in said synthetic resin sheet, and includes 40 to 85% by mass of said silica particles.

3. The lead storage battery in accordance with claim 1, wherein said separator comprises a fiber mat and silica particles retained by said fiber mat, and includes 10 to 40% by mass of said silica particles.

4. The lead storage battery in accordance with claim 1, wherein said negative electrode active material layer includes 0.0002 to 0.006 parts by mass of said Sb per 100 parts by mass of the negative electrode active material and Sb in total.

5. The lead storage battery in accordance with claim 1, wherein said positive electrode grid has a lead alloy layer containing Sn in at least a part of a surface thereof.

6. The lead storage battery in accordance with claim 1, wherein said separator is shaped like a bag, and accommodates said negative electrode plate.

7. The lead storage battery in accordance with claim 1, wherein a mass ratio of the negative electrode active material to the positive electrode active material in said electrode plate pack is 0.7 to 1.3.

8. The lead storage battery in accordance with claim 1, wherein
said negative electrode grid is an expanded grid comprising an expanded mesh retaining said negative electrode active material layer, a frame provided at an upper edge portion of said expanded mesh, and said tab connected to said frame, and
a ratio of a height of said tab to a width of said frame is 2.2 to 15.0.

9. A lead storage battery including:
an electrode plate pack comprising a plurality of negative electrode plates which each comprise a negative electrode grid having a tab and a negative electrode active material layer retained by said negative electrode grid, a plurality of positive electrode plates which each comprise a positive electrode grid having a tab and a positive electrode active material layer retained by said positive electrode grid, and a plurality of separators separating said positive electrode plate and said negative electrode plate;
a positive electrode connecting member comprising a positive electrode strap to which said tab of each positive electrode plate of the electrode plate pack is connected, and a positive electrode pole or a positive electrode connecting body provided at said positive electrode strap; and a negative electrode connecting member comprising a negative electrode strap to which said tab of each negative electrode plate of the electrode plate pack is connected, and a negative electrode pole or a negative electrode connecting body provided at said negative electrode strap, wherein said positive electrode grid, said negative electrode grid, said positive electrode connecting member, and said negative electrode connecting member comprise a Pb-alloy including at least one of Ca and Sn, said negative electrode active material layer includes Sb, said separator includes silica and contains 5.0 to 30% by mass of an oil, the mass ratio of the negative electrode active material to the positive electrode active material in said electrode plate pack is 0.7 to 1.3, and said electrode plate pack, said positive electrode strap, and said negative electrode strap are immersed in an electrolyte such that the level of the electrolyte is always above the electrode plate pack, the positive electrode strap and the negative electrode strap.

10. The lead storage battery in accordance with claim 1, wherein said Pb-alloy in said positive electrode grid and said positive electrode connecting member does not include Sb, or contains Sb in an amount of 0.001 to 0.002% by mass as an impurity; and said Pb-alloy in said negative electrode grid and said negative electrode connecting member does not include Sb, or contains Sb in an amount of less than 0.0001% by mass as an impurity.

11. The lead storage battery in accordance with claim 9, wherein said Pb-alloy in said positive electrode grid and said positive electrode connecting member does not include Sb, or contains Sb in an amount of 0.001 to 0.002% by mass as an impurity; and said Pb-alloy in said negative electrode grid and said negative electrode connecting member does not include Sb, or contains Sb in an amount of less than 0.0001% by mass as an impurity.

12. The lead storage battery in accordance with claim 8, wherein a ratio of a height of said tab to a width of said frame is 7.5 to 12.0.

13. The lead storage battery in accordance with claim 9, wherein the mass ratio of the negative electrode active material to the positive electrode active material in said electrode plate pack is 0.82 to 1.08.

14. The lead storage battery in accordance with claim 1, wherein said separator contains 10 to 30% by mass of the oil.

15. The lead storage battery in accordance with claim 9, wherein said separator contains 10 to 30% by mass of the oil.

* * * * *